(12) United States Patent
Hwang

(10) Patent No.: US 10,675,848 B2
(45) Date of Patent: Jun. 9, 2020

(54) LAMINATE FILM FOR BLOCKING VIRUS AND METHOD FOR MANUFACTURING SAME

(71) Applicant: UPC LIMITED, Chungcheongnam-do (KR)

(72) Inventor: Chang Yeon Hwang, Daejeon (KR)

(73) Assignee: UPC LIMITED, Chungcheongnam-Do (KR)

( * ) Notice: Subject to any disclaimer, the term of this patent is extended or adjusted under 35 U.S.C. 154(b) by 236 days.

(21) Appl. No.: 15/507,210

(22) PCT Filed: Aug. 27, 2015

(86) PCT No.: PCT/KR2015/008975
§ 371 (c)(1),
(2) Date: Feb. 27, 2017

(87) PCT Pub. No.: WO2016/032248
PCT Pub. Date: Mar. 3, 2016

(65) Prior Publication Data
US 2017/0297314 A1    Oct. 19, 2017

(30) Foreign Application Priority Data
Aug. 29, 2014  (KR) .................. 10-2014-0114092

(51) Int. Cl.
*B32B 27/32* (2006.01)
*B32B 37/12* (2006.01)
(Continued)

(52) U.S. Cl.
CPC .............. *B32B 27/32* (2013.01); *B32B 5/022* (2013.01); *B32B 5/26* (2013.01); *B32B 7/04* (2013.01);
(Continued)

(58) Field of Classification Search
CPC ......... B32B 27/32; B32B 27/06; B32B 27/08; B32B 5/022; B32B 7/12; B32B 37/0053; B32B 37/12; B32B 37/1292
(Continued)

(56) References Cited

U.S. PATENT DOCUMENTS

2009/0099542 A1* 4/2009 Thomas ............ A61F 13/15593
604/378
2010/0285301 A1* 11/2010 Dieudonne .......... B01D 67/009
428/315.5
(Continued)

FOREIGN PATENT DOCUMENTS

JP       2013516555 A    5/2013
KR  1020050046864 A    5/2005
(Continued)

OTHER PUBLICATIONS

Machine translation of KR-10-2005-0046864 (Year: 2005).*
(Continued)

*Primary Examiner* — Vincent Tatesure
(74) *Attorney, Agent, or Firm* — McCoy Russell LLP

(57) ABSTRACT

The present invention relates to a laminate film for blocking a virus and a method for manufacturing same, including a laminate film for blocking a virus in which an air-permeable film layer including 20 to 40 parts by weight of an inorganic filler with respect to 100 parts by weight of a polyethylene resin, an adhesive layer, and a non-woven fabric layer including a bi-component non-woven fabric that is made by mixing at least two selected from polyolefin-based non-woven fabrics, are sequentially laminated, and to a method for manufacturing the laminate film, comprising: a) manufacturing an air-permeable film by stretching a disc-shaped sheet obtained by melting and extruding a compound composition and processing same; b) coating an adhesive on one surface of the air-permeable film which has been stretched;

(Continued)

c) adhering, a bi-component non-woven fabric; and d) rolling using rollers.

4 Claims, 2 Drawing Sheets

(51) Int. Cl.
    *B32B 27/06*     (2006.01)
    *B32B 37/00*     (2006.01)
    *B32B 5/26*     (2006.01)
    *B32B 7/04*     (2019.01)
    *B32B 27/20*     (2006.01)
    *B32B 27/16*     (2006.01)
    *B32B 27/12*     (2006.01)
    *B32B 5/02*     (2006.01)
    *B32B 7/12*     (2006.01)
    *B32B 27/08*     (2006.01)

(52) U.S. Cl.
    CPC ............... *B32B 7/12* (2013.01); *B32B 27/06* (2013.01); *B32B 27/08* (2013.01); *B32B 27/12* (2013.01); *B32B 27/16* (2013.01); *B32B 27/20* (2013.01); *B32B 37/0053* (2013.01); *B32B 37/12* (2013.01); *B32B 37/1292* (2013.01); *B32B 2250/02* (2013.01); *B32B 2250/03* (2013.01); *B32B 2262/0253* (2013.01); *B32B 2264/10* (2013.01); *B32B 2264/102* (2013.01); *B32B 2264/104* (2013.01); *B32B 2264/12* (2013.01); *B32B 2305/20* (2013.01); *B32B 2307/516* (2013.01); *B32B 2307/546* (2013.01); *B32B 2307/5825* (2013.01); *B32B 2307/718* (2013.01); *B32B 2307/724* (2013.01); *B32B 2307/7265* (2013.01); *B32B 2437/00* (2013.01); *B32B 2556/00* (2013.01); *B32B 2571/00* (2013.01)

(58) Field of Classification Search
    USPC .......................................................... 442/149
    See application file for complete search history.

(56) References Cited

U.S. PATENT DOCUMENTS

2011/0003146 A1*   1/2011   Qiu ................... C08G 18/1808
                                                              428/355 N
2014/0287643 A1*   9/2014   Nozaki ..................... B32B 5/02
                                                              442/311

FOREIGN PATENT DOCUMENTS

| KR | 1020050047009 A | 5/2005 |
| KR | 1020060063214 A | 6/2006 |
| KR | 1020100096178 A | 9/2010 |
| KR | 1020140031302 A | 3/2014 |

OTHER PUBLICATIONS

ISA Korean Intellectual Property Office, International Search Report Issued in Application No. PCT/KR2015/008975, dated Nov. 26, 2015, WIPO, 6 pages.

* cited by examiner

LAMINATE FILM FOR BLOCKING VIRUS AND METHOD FOR MANUFACTURING SAME

CROSS-REFERENCE TO RELATED APPLICATIONS

The present application is a U.S. National Phase of International Patent Application Serial No. PCT/KR2015/008975, entitled "LAMINATE FILM FOR BLOCKING VIRUS AND METHOD FOR MANUFACTURING SAME," filed on Aug. 27, 2015. International Patent Application Serial No. PCT/KR2015/008975 claims priority to Korean Patent Application No. 10-2014-0114092, filed on Aug. 29, 2014. The entire contents of each of the above-cited applications are hereby incorporated by reference in their entirety for all purposes.

TECHNICAL FIELD

The present invention relates to a laminate film for blocking a virus and a method for manufacturing the same, and more particularly, to a laminate film for blocking a virus having excellent virus blocking property which is capable of passing sweat and water vapor, having a blocking function against viruses, other pathogens, etc., and being usable for disinfection, medical fields, etc., and a method for manufacturing the same.

BACKGROUND ART

Moisture-permeable fabrics and waterproof fabrics may be classified into fabrics with virus blocking ability and fabrics without virus blocking ability. In the current market, air-permeable polyethylene fabrics based on potassium carbonate and a polyethylene resin which have no virus blocking ability, have been used so far. These products have air permeability, moisture permeability, and waterproof function, but due to limitation of virus passage, these products have been used for disposable diapers, sanitary pads, general industrial building materials such as house wrap and roofing, and general industrial work clothes, etc.

In addition, products such as Gore-Tex (PTFE), polyester film, nylon film, and polyurethane moisture-permeable waterproof fabric, etc., which are typical of moisture-permeable and waterproof fabrics, already have a unique position in an outdoor clothing field. These products are made by adsorbing a fluororesin film on a fabric surface or by coating or adhering the polyester film or nylon film on the fabric, and all of the polyurethane moisture-permeable and waterproof products are porous products obtained by applying a polyurethane moisture permeable resin to a fabric by a roll coater method or a knife coater method to form fine pores, and providing functions thereon.

However, these products are commonly expensive, and thus, they have been neglected in medicine, disinfection and control fields that are characterized in that products should be discarded due to contamination and infection from infectious viruses when they are used once.

In recent years, there has been increasingly known of the contagious bird virus influenza around the world. In particular, in China, pathogens such as infectious foot-and-mouth disease virus, bird virus, etc., are spread to people, and cause deaths. Accordingly, people in this field and people in the related industry have become concerned about virus infection.

Therefore, it is urgent to develop a disinfection garment, a control garment, a protective garment, a surgical gown, a surgical garment, a packaging material for packaging surgical instruments, a patient bed cover, a sheet for preventing bedsores, etc., having moisture permeability function and waterproof function, while simultaneously having virus blocking function so as to be discarded after being used once.

DISCLOSURE

Technical Problem

An object of the present invention is to provide a laminate film for blocking a virus capable of being manufactured at a significantly economical cost as compared to conventional laminate films, and a method for manufacturing the same.

Another object of the present invention is to provide a laminate film for blocking a virus capable of having a virus blocking ability, moisture permeability, and a waterproof ability, while simultaneously having excellent workability for mass production, and a method for manufacturing the same.

Another object of the present invention is to provide a laminate film for blocking a virus capable of being processed by ultrasonic sewing, and a method for manufacturing the same.

Another object of the present invention is to provide a novel laminate film for blocking a virus capable of providing soft texture like ordinary clothes.

Technical Solution

Hereinafter, a laminate film for blocking a virus, and a method for manufacturing the same according to the present invention will be described in detail.

In one general aspect, a laminate film for blocking a virus includes: an air-permeable film layer including a polyethylene resin and an inorganic filler, an adhesive layer, and a non-woven fabric layer including a bi-component non-woven fabric which is a polyolefin-based mixed non-woven fabric, wherein the air-permeable film layer, the adhesive layer, and the non-woven fabric layer are sequentially stacked.

The air-permeable film layer including 10 to 120 parts by weight, preferably, 15 to 80 parts by weight, and more preferably, 20 to 40 parts by weight of the inorganic filler with respect to 100 parts by weight of the polyethylene resin, the adhesive layer, and the non-woven fabric layer including the bi-component non-woven fabric which is the polyolefin-based mixed non-woven fabric, may be sequentially stacked.

The laminate film for blocking a virus may further include: an adhesive layer, and a polypropylene spunbond non-woven fabric layer, wherein the adhesive layer and the polypropylene spunbond non-woven fabric layer are sequentially stacked on the other side of the air-permeable film layer.

The air-permeable film of the laminate film for blocking a virus may have a basis weight of 10 to 50 g/m², moisture permeability of 3,000 to 10,000 g/m²□24 hr, air permeability of 500 to 1,000 sec, and water pressure resistance of 50 to 100 cm/$H_2O$ to have excellent air permeability, and to improve moisture permeability and a waterproof ability which are objects of the present invention.

The inorganic filler used in the air-permeable film in the present invention is not particularly limited, but for example, may be any one or two or more selected from the group consisting of calcium carbonate, talc, clay, kaolin, silica, and diatomaceous earth, the inorganic filler having an average particle size of 0.5 to 30 μm, but the average particle size thereof is not limited thereto.

In the laminate film for blocking a virus of the present invention, when the polyethylene spunbond non-woven fabric and the polypropylene spunbond non-woven fabric are mixed to be used as the bi-component non-woven fabric, although the reason is not known, not only a virus blocking ability which is an object of the present invention may be improved, but also a very soft feeling of the laminate film may be provided. Accordingly, it is possible to provide a very soft laminate film which is completely different from conventional laminate films having stiff feeling.

The non-woven fabric layer is not particularly limited in the present invention, but when the basis weight of the non-woven fabric of the bi-component is 10 to 50 g/m$^2$, it is more preferred since the virus blocking ability and soft feeling, which are objects of the present invention, may be enhanced.

The adhesive is not limited in the present invention, but the adhesive is formed on a non-woven fabric or an air-permeable film in a mesh form by using a gravure printing method or a mesh roll printing method, thereby contacting the air-permeable film and the non-woven fabric layer.

In the present invention, a method for forming the adhesive layer is not limited as long as an adhesive layer in a mesh form is formed when the adhesive layer is formed, but the adhesive layer may be formed by a method for transferring the adhesive layer using a roll engraved with a mesh. More specifically, for example, the adhesive layer may be formed by using a copper plate of a gravure coater which is engraved into a size of 40 to 250 mesh in a mesh form, and laser-engraved with a grid pattern having a line thickness x line spacing x line depth of 0.1 to 1 mm×1 to 10 mm×10 to 150 μm to provide a sufficient virus blocking ability which is an object of the present invention since it is possible to provide excellent virus blocking ability and excellent adhesive force. In particular, it is preferred that the adhesive layer may be engraved into a size of 40 to 250 mesh since the virus blocking ability may be maximally exhibited.

A material of the adhesive layer is not particularly limited in the present invention, but specifically, a polyurethane adhesive is further recommended since it is known that an antiviral effect is increased when the polyurethane adhesive is applied. Thus, when a polyurethane adhesive layer is described as an example, the adhesive layer may include a polyurethane adhesive resin in which a polyether polyol is mixed with a polyester polyol, and for example, the adhesive layer may include the polyether polyol and the polyester polyol at a weight ratio of 50:50 to 20:80.

The adhesive layer may be formed by an adhesive composition including 50 to 90 wt % of a polyurethane adhesive resin, 0.1 to 10 wt % of an accelerator, 1 to 20 wt % of a solvent, and 5 to 40 wt % of an isocyanate-based curing agent. The adhesive composition of the adhesive layer according to the present invention is not limited, but the adhesive composition may have a viscosity of 200 to 2,000 cps/20° C. since it is good to handle. Further, the polyester polyol and the polyether polyol may preferably have a number average molecular weight (Mn) ranging from 1,000 to 20,000, respectively.

The curing agent may include, for example, any one or two or more selected from the group consisting of aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate, etc.; alicyclic diisocyanates such as cyclohexane-1,4-diisocyanate, isophorone diisocyanate, lysine diisocyanate, dicyclohexylmethane-4,4'-diisocyanate, 1.3-bis(isocyanatemethyl)cyclohexane, methylcyclohexane diisocyanate, isopropylidene dicyclohexyl-4,4'-diisocyanate, norbornane diisocyanate, etc.; and aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, and tetramethylxylylene diisocyanate; etc., but is not limited thereto.

The accelerator may accelerate a urethane reaction, and an organic acid component may be mainly used as the accelerator. Examples of the accelerator may include monocarboxyic acids such as propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, benzoic acid, etc., but the accelerator is not limited thereto.

The solvent is not limited as long as it is capable of dissolving the components of the present invention, and examples of the solvent may include ketone-based compounds such as acetone, methyl ethyl ketone (MEK), and methyl isobutyl ketone, etc., cyclic ether-based compounds such as tetrahydrofuran (THF), dioxolane, etc., ester-based compounds such as methyl acetic acid, ethyl acetic acid, and butyl acetic acid, etc., aromatic compounds such as toluene, xylene, etc., and alcohol-based compounds such as carbitol, cellosolve, methanol, isopropanol, butanol, and propylene glycol monomethyl ether, etc. In addition, the solvent may be used alone or in combination with two or more kinds thereof.

In an example of the present invention, when the polyether polyol or the polyester polyol alone is used together with other curing agents and accelerators, although the reason is not precisely known, a sufficient antiviral effect is not able to be achieved. The most excellent antiviral effect is exhibited when the polyester polyol has a composition ratio of 50:50 to 80:20 as described in the present invention.

In an example of the present invention, since the adhesive composition may be easily obtained, the adhesive composition may be prepared in various composition ratios. Further, adhesive products may be purchased to be used. For example, products such as SPU-7385 manufactured by Samho Hwasung, etc., may be included.

In another general aspect, the present invention also includes a virus blocking clothing manufactured with the laminate film for blocking a virus according to the exemplary embodiments of the present invention.

In another general aspect, there is provided a method for manufacturing a laminate film for blocking a virus.

The manufacturing method of the present invention is described as follows.

First, there is provided the method for manufacturing a laminate film for blocking a virus, including a) manufacturing an air-permeable film by stretching a disc-shaped sheet obtained by melt-extruding a compound composition for an air-permeable film in an extruder and processing the compound composition through a T-die or a circular die, b) applying an adhesive on one surface of the air-permeable film obtained from the stretching, c) adhering, to the air-permeable film applied with the adhesive, a bi-component non-woven fabric which is a polyolefin-based mixed non-woven fabric, and d) rolling using a roller.

Further, the method may further include, in addition to the manufacturing method, e) applying an adhesive to the other side of the air-permeable film, f) adhering, to the air-permeable film applied with the adhesive, a polypropylene spunbond non-woven fabric, and g) rolling using a roller.

Particularly, in the present invention, when the manufacturing method further includes, after step a), performing a plasma treatment on the air-permeable film, it is observed that adhesive force of the laminate film for blocking a virus may be further improved, tearing thereof may be prevented, and antiviral ability may be slightly improved, and thus, the further inclusion of the plasma treatment is also within the scope of the present invention.

In addition, in the manufacturing method of the present invention, the method for forming the adhesive layer is the same as described above. The adhesive layer is formed by applying the adhesive on a non-woven fabric layer or an air-permeable film layer, using a copper plate of a gravure coater which is engraved into a size of 40 to 250 mesh, and laser-engraved with a grid pattern having a line thickness x line spacing x line depth of 0.1 to 1 mm×1 to 10 mm×10 to 150 μm on an entire surface.

As described above, the present invention is characterized in that the non-woven fabric layer including the bi-component non-woven fabric which is a polyolefin-based mixed non-woven fabric exhibits a very important effect, and the laminate film according to the present invention is capable of having excellent air permeability function, moisture permeability function, and waterproof function, while simultaneously blocking viruses.

Hereinafter, the laminate film for blocking a virus of the present invention is described in more detail.

FIGS. 1 and 2 are provided as more preferred reference examples of the present invention.

First, FIG. 1 shows a 2-layered laminate film for blocking a virus in which an air-permeable film layer 10 including a polyethylene resin and an inorganic filler, an adhesive layer 20, and a non-woven fabric layer 30 including a bi-component non-woven fabric which is a polyolefin-based mixed non-woven fabric, are sequentially stacked, as an embodiment of the present invention.

FIG. 2 shows a 3-layered laminate film for blocking a virus in which an air-permeable film layer 10 including a polyethylene resin and an inorganic filler, an adhesive layer 20, and a non-woven fabric layer 30 including a bi-component non-woven fabric which is a polyolefin-based mixed non-woven fabric, are sequentially stacked, and in which the adhesive layer 40 and a polypropylene spunbond non-woven fabric 50 are sequentially stacked on the other side of the air-permeable film layer, as an another embodiment of the present invention.

The air-permeable film layer (10) may be manufactured by adding an inorganic filler to a polyolefin resin to manufacture an extrusion sheet, followed by stretching, and thus, waterproof property and air-permeable property may be improved.

The inorganic filler may be any one or two or more selected from the group consisting of calcium carbonate, talc, clay, kaolin, silica, and diatomaceous earth. An average particle diameter of the inorganic filler may be selected to be used according to the object of the present invention, and is not limited for moisture permeability, air permeability, and mechanical strength, but the average particle diameter of the inorganic filler is preferably 0.5 to 30 μm. A content of the inorganic filler is preferably 10 to 120 parts by weight, preferably 15 to 80 parts by weight, more preferably 20 to 40 parts by weight, based on 100 parts by weight of the polyethylene resin, to improve bending strength, elasticity, and flexibility.

The air-permeable film layer 10 preferably has the basis weight of 10 to 50 g/m$^2$ to maintain moisture permeability, waterproof ability, and air permeability without being torn easily. In addition, the air-permeable film layer 10 in which moisture permeability is 3,000 to 10,000 g/m$^2$□24 hr, air permeability is 500 to 1,000 sec, and water pressure resistance is 50 to 100 cm/H$_2$O is suitable for the object of the present invention.

The adhesive layer 20 of the present invention may be formed by applying an adhesive to one surface of the air-permeable film layer 10 or to one surface of the non-woven fabric layer 30. The adhesive may be a 2-liquid type adhesive that includes 50 to 90 wt % of a polyurethane adhesive resin in which a polyether polyol and a polyester polyol are mixed at a weight ratio of 50:50 to 20:80, 0.1 to 10 wt % of an accelerator, 1 to 20 wt % of a solvent, and 5 to 40 wt % of an isocyanate-based curing agent, but is not necessarily limited.

In the adhesive, 50 to 90 wt % of the polyurethane adhesive resin in which the polyether polyol and the polyester polyol are mixed at a weight ratio of 50:50 to 20:80 may be used to maintain moisture permeability and waterproof ability through active diffusion of the polyurethane adhesive resin, while simultaneously enhancing an adhesive ability and maintaining a virus blocking function.

Specifically, the accelerator may be, for example any one or two or more selected from the group consisting of organic acid metal salts such as tin octylic acid, etc., organic tertiary amine salts such as triethylene amine, etc., but is not necessarily limited thereto. A content of the accelerator is preferably 0.1 to 10 wt % to control the curing time.

Specifically, the solvent may be, for example, any one or two or more selected from the group consisting of 1-methyl-2-pyrrolidone (NMP), methyl ethyl ketone (MEK), and acetone, but is not necessarily limited thereto. A content of the solvent is not limited, but is preferably 1 to 20 wt %.

Specifically, the curing agent may be, for example, any one or two or more selected from the group of diphenylmethane diisocyanate, 1,6-hexamethylene diisocyanate, trilene diisocyanate and thiodipropyl diisocyanate, but is not necessarily limited thereto. A content of the curing agent is preferably 5 to 40 wt %.

It is preferred that the adhesive of the present invention has a viscosity of 200 to 2,000 cps/20° C., preferably 200 to 1,500 cps/20° C., and more preferably 500 to 1,000 cps/20° C. to improve moisture permeability and waterproof function, control an appropriate adhesive force with a material to be adhered, and to improve workability for mass production while having a virus blocking ability for achieving the object of the present invention. Further, an automatic viscosity control apparatus may be used to constantly maintain the viscosity of the adhesive, but the present invention is not limited thereto.

The adhesive of the present invention is characterized by being used to control appropriate adhesive force with the material to be adhered, and by being used for high-speed operation and mass production of products.

The adhesive layer 20 preferably has the basis weight of 1 to 10 g/m² to obtain excellent adhesive force, air permeability, and workability, but the basis weight is not necessarily limited thereto.

In the present invention, the non-woven fabric layer 30 may enhance tensile strength which is a mechanical property, prevent tearing, and increase a role of blocking viruses. The non-woven fabric layer 30 of the present invention may be formed using the bi-component non-woven fabric which is a polyolefin-based mixed non-woven fabric.

The bi-component non-woven fabric refers to a mixed non-woven fabric of any two or more selected from polyolefin-based non-woven fabrics. Specifically, for example, a non-woven fabric in which a polypropylene spunbond non-woven fabric and a polyethylene spunbond non-woven fabric are mixed may be used to have excellent virus blocking ability.

More specifically, for example, at the time of using a bi-component non-woven fabric in which a polypropylene spunbond non-woven fabric and a polyethylene spunbond non-woven fabric are thermocompressed or adhered with an adhesive to be laminated at a weight ratio of 40 to 60:10 to 90, although the reason is not precise, the mixed non-woven fabric mixed in the above-described range is preferably used due to excellent virus blocking effect.

In addition, the bi-component non-woven fabric is advantageous in that the air permeability is maintained, the moisture permeability and waterproof function are improved, the feeling of softness is further enhanced, and the virus blocking ability is improved, as compared to a case where the polypropylene spunbond non-woven fabric is used alone.

The non-woven fabric layer 30 preferably has the basis weight of 10 to 50 g/m² to enhance tensile strength which is a mechanical property, to prevent tearing, etc., and to improve the virus blocking ability, but the basis weight is not necessarily limited thereto.

Virus blocking clothings such as a disposable swimwear, a disinfection garment, a protective garment, etc., manufactured with the laminate film for blocking a virus as described above are also included in the scope of the present invention.

Hereinafter, the method for manufacturing a laminate film for blocking a virus of the present invention is described in detail.

More specifically, the present invention is described with reference to a dry lamination apparatus of FIG. 3.

An air-permeable film unwound from an air-permeable film supply device is introduced into an adhesive application device, and the adhesive is applied to one side of the air-permeable film by an application roller. The air-permeable film applied with the adhesive in the adhesive application device as described above is transported to a drying chamber and dried to a predetermined level. Then, the air-permeable film discharged from the drying chamber together with a non-woven fabric supplied from a bi-component non-woven fabric supply device are introduced into a lamination apparatus, and are pressed to each other to be adhered and laminated by a first compression roller and a second compression roller, thereby manufacturing a laminate film for blocking a virus of the present invention.

The laminate film for blocking a virus manufactured in the present invention is characterized by having excellent air permeability, moisture permeability, and waterproof function, while simultaneously blocking viruses.

The method for manufacturing the 2-layered laminate film for blocking a virus of FIG. 1 of the present invention includes, a) manufacturing an air-permeable film 10 by uniaxially stretching a disc-shaped sheet obtained by melt-extruding a compound composition for an air-permeable film in an extruder and processing the compound composition through a T-die or a circular die, b) applying an adhesive 20 on one surface of the air-permeable film 10 obtained from the stretching, c) adhering, to the air-permeable film 10 applied with the adhesive 20, a bi-component non-woven fabric 30 which is a polyolefin-based mixed non-woven fabric, and d) rolling using a roller.

In addition, the method for manufacturing the 3-layered laminate film for blocking a virus of FIG. 2 of the present invention may further include, a) applying an adhesive 40 to the other side of the air-permeable film 10, b) adhering, to the air-permeable film 10 applied with the adhesive, a polypropylene spunbond non-woven fabric 50, and c) rolling using a roller, in the method for manufacturing the 2-layered laminate film for blocking a virus.

The method for manufacturing the air-permeable film in step a) is described in more detail. In preparing a compound composition for an air-permeable film, a polyethylene resin may be mixed with an inorganic filler to obtain a mixture, and the mixed compound composition may be palletized. The compound composition may be put into a hopper to mold a disc-shaped sheet according to a conventional film molding apparatus by extrusion processing and molding method, and may be practiced by appropriately adopting inflation molding by a circular die, extrusion molding by a T-die, etc. Next, the disc-shaped sheet molded according to the extrusion method may be uniaxially stretched in the range of 1.2 to 6 times, preferably 1.5 to 5 times. However, the present invention is not necessarily limited thereto.

The polyethylene resin is not limited as long as it has a molecular weight enough to form a film. But, in the present invention, a polyethylene resin having a melt index ranging from 1 to 7 g/10 min (190° C., 2.16 kg) is preferably used to maintain mechanical properties, air permeability, and moisture permeability.

Step b) is a step of applying the adhesive to one surface of the air-permeable film manufactured in step a).

More specifically, the adhesive may be applied to one surface of the air-permeable film using a copper plate of a gravure coater, and specifically, the copper plate of the gravure coater in which a surface thereof is primarily engraved into a size of 40 to 250 mesh using a heliography technique, and an entire surface thereof is secondarily laser-engraved with a grid pattern in a line thickness x line spacing x line depth of 0.1 to 1 mm×1 to 10 mm×10 to 150 μm, may be used.

The present invention is characterized in that the adhesive may be applied using the copper plate, and thus, the virus blocking function, the moisture permeability, and the waterproof function may be improved and the adhesive force may be further improved by a synergy effect as compared to a case where only the conventional grid pattern copper plate is used.

The bi-component non-woven fabric that is unwound from the rollers may be adhered on the surface to which the polyurethane adhesive is applied as described above, and rolled and adhered by the rollers.

The adhesive may be a 2-liquid type adhesive that includes 50 to 90 wt % of a polyurethane adhesive resin in which a polyether polyol and a polyester polyol are mixed at a weight ratio of 50:50 to 20:80, 0.1 to 10 wt % of an accelerator, 1 to 20 wt % of a solvent, and 5 to 40 wt % of an isocyanate-based curing agent, and thus, it is possible to perform high-speed operation and mass production.

According to the manufacturing method, the 2-layered laminate film for blocking a virus in which the polypropylene spunbond or the bi-component non-woven fabric and the polypropylene spunbond non-woven fabric are stacked on one surface of the air-permeable film is manufactured, and the laminate film may be applied to a disinfection field and a control field such as a disposable disinfection garment, a control garment, a protective garment that require blocking functions against virus infection.

A plasma treatment on the non-woven fabric of step c) may be further included, and adhesive force between the air-permeable film and the non-woven fabric layer may be further improved by performing the plasma treatment.

Next, the polyurethane adhesive is subjected to gravure coating on the opposite surface of the air-permeable film in the same manner as described above, and then the polypropylene spunbond non-woven fabric unwound from the rollers is adhered thereto, pressed by the rollers, and finally wound around a winding roller.

According to such a manufacturing method, a 3-layered laminate film for blocking a virus in which the bi-component non-woven fabric and the polypropylene spunbond non-woven fabric are stacked on both surfaces of the air-permeable film is manufactured. The laminate film may be applied to surgical-related packing materials such as surgical garments and surgical gowns, etc., in a healthcare environment where more reliable virus blocking is required due to serious concerns about virus infection.

In sewing of disposable garments used in disinfection and medical fields according to the related art, which is unlike general sewing, the garments are primarily sewn, and then, a sealing tape is attached to the gap in the place, and used. This operation is a factor of price increase due to the inefficiency in which the operation needs to be performed two times, an increase of material costs and an increase of labor costs. The present invention is characterized in that the bi-component non-woven fabric which is a mixed non-woven fabric of any two or more selected from polyolefin-based non-woven fabrics is used to be capable of manufacturing the laminate film for blocking a virus capable of being processed by ultrasonic sewing, being sewn in a single time, and having high efficiency.

The laminate film for blocking a virus manufactured according to the present invention is characterized by having physical properties such as moisture permeability of 5,000 to 9,000 g/m²☐24 hr, water pressure resistance of 100 to 300 cm/H$_2$O, and adhesive strength of 80 to 300 g.

Advantageous Effects

The laminate film for blocking a virus according to the present invention may have excellent air permeability, moisture permeability, and waterproof function, and simultaneously may have a blocking force against the virus.

In addition, the laminate film for blocking a virus may be processed by ultrasonic sewing, and thus, a manufacturing time may be saved and a manufacturing cost may be economical when a disposable disinfection garment, a control garment, a protective garment, a surgical garment, etc., are manufactured.

Further, the disposable disinfection garment, the control garment, the protective garment, the surgical garment, etc., may be manufactured with the laminate film including the bi-component non-woven fabric, and thus, the feeling of softness is further enhanced while simultaneously having an excellent virus blocking ability as compared to laminate films manufactured by using non-woven fabrics according to the related art.

BEST MODE

Figure 1:
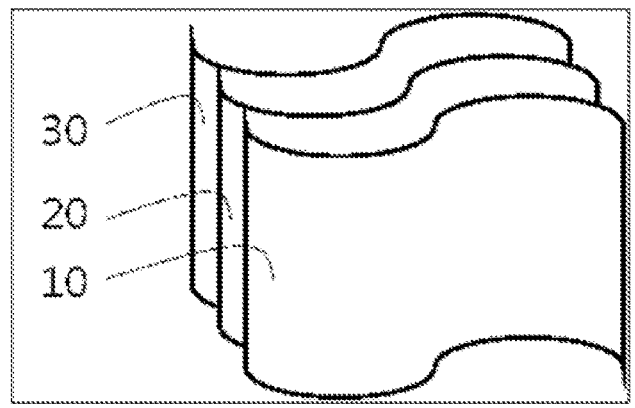
FIG. 1 shows a stacked structure of a 2-layered laminate film for blocking a virus of the present invention.
Figure 2:
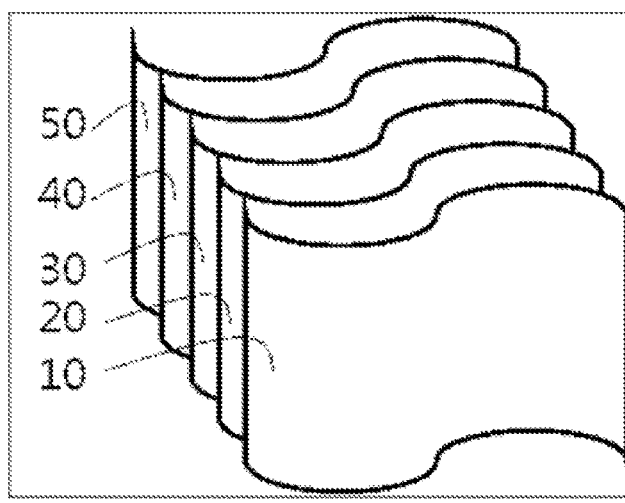
FIG. 2 shows a stacked structure of a 3-layered laminate film for blocking a virus of the present invention.
Figure 3:
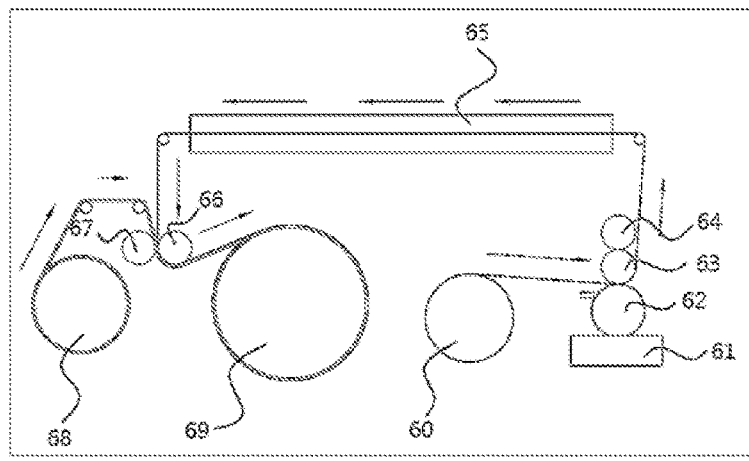
FIG. 3 shows a dry lamination apparatus for manufacturing a laminate film for blocking a virus in the present invention.
Figure 4:
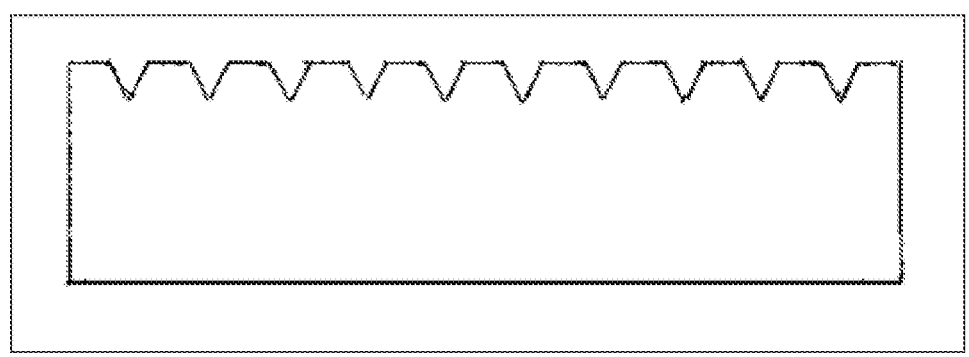
FIG. 4 is a cross-sectional view of a primarily engraved gravure copper plate.
Figure 5:
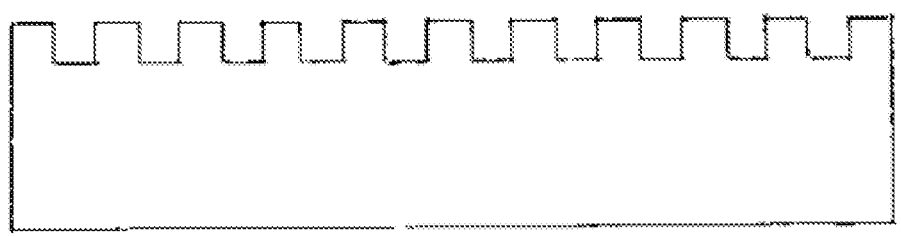
FIG. 5 is a cross-sectional view of a secondarily engraved gravure copper plate.

Hereinafter, Examples will be provided in order to describe the present invention in more detail. However, the present invention is not limited to Examples below.

Hereinafter, physical properties were measured by the following methods.

1) Moisture Permeability

Moisture permeability was measured by a CaCl$_2$ method according to ASTM E-96.

2) Air Permeability

Air permeability was measured by a Gurley method according to ISO5636/5.

3) Water Pressure Resistance

Water pressure resistance was measured according to AATCC127.

4) Blocking Force against Virus

A blocking force against a virus was measured according to ASTM F1671.

The blocking force against a virus was measured according to ISO16604 ("step 5 passed" means the most excellent blocking ability against a virus).

5) Adhesive force

Adhesive force was measured according to ASTM D5034.

Example 1

50 parts by weight of calcium carbonate (Yabashi Korea, YK1C) was mixed with 100 parts by weight of low density polyethylene (Hanwha Chemical, HANWHA LDPE 955, MI: 7.5, density: 0.913), melt-extruded, and stretched to manufacture an air-permeable film, wherein a basis weight was 20 g/m², moisture permeability was 3,500 g/m²☐24 hr, air permeability was 620 sec, and water pressure resistance was 62 cm/H$_2$O.

The air-permeable film manufactured above was introduced into an adhesive applicator, and was applied with an adhesive (SPH-7385, Samho Hwasung) by an application roller. Here, the adhesive was transfer-applied by the application roller, specifically, a copper plate of a 210 mesh gravure coater which was laser-engraved with a grid pattern.

The air-permeable film applied with the adhesive was transported to a lamination apparatus together with a bi-component spunbond non-woven fabric (a laminate including a polypropylene spunbond non-woven fabric (LPN-30 from UPC Company) and a polyethylene spunbond non-woven fabric (Alstrom) mixed at a weight ratio of 50:50 and having a basis weight of 25 g/m$^2$) and supplied to one surface of the air-permeable film, compressed (175° C.) by a compression roller, adhered and laminated.

Example 2

Example 2 was performed in the same manner as in Example 1 except that the same adhesive layer as Example 1 and a polypropylene spunbond non-woven fabric (polypropylene spunbond non-woven fabric (LPN-30 from UPC Company) with a basis weight of 31 g/m$^2$) formed on the adhesive layer were further added to the other surface of the air-permeable film.

Example 3

Example 3 was performed in the same manner as in Example 1 except that the mesh was changed to 40.

Example 4

Example 4 was performed in the same manner as in Example 1 except that the air-permeable film was subjected to a low-temperature plasma treatment. As a result, adhesive force was remarkably increased, and the virus blocking ability was most excellent.

Comparative Example 1

Comparative Example 1 was performed in the same manner as in Example 1 except that a polypropylene spunbond non-woven fabric (LPN-30 from UPC Company with a basis weight of 25 g/m$^2$) was used instead of the bi-component spunbond non-woven fabric of Example 1.

Comparative Example 2

Comparative Example 2 was performed in the same manner as in Comparative Example 1 except that the adhesive layer of Example 1 and the spunbond non-woven fabric of Comparative Example 1 (LPN-30 from UPC Company with a basis weight of 31 g/m$^2$) were stacked on the other surface of the air-permeable film of Comparative Example 1.

TABLE 1

| | Moisture Permeability (g/m$^2$ · 24 hr) | Water Pressure Resistance (cm/H$_2$O) | Adhesive strength (g) | Virus blocking | |
|---|---|---|---|---|---|
| | | | | ISO 16604 | ASTM F1671 |
| Example 1 | 1,200 | 100 | 53 | Step 5 Passed | Passed |
| Example 2 | 1,010 | 150 | 51 | Step 5 Passed | Passed |
| Example 3 | 1,250 | 100 | 51 | Step 4 Passed | Passed |
| Example 4 | 1,310 | 130 | 57 | Step 5 Passed | Passed |
| Comparative Example 1 | 897 | 73 | 52 | Step 2 Passed | Not passed |
| Comparative Example 2 | 714 | 82 | 49 | Step 3 Passed | Not passed |

DETAILED DESCRIPTION OF MAIN ELEMENTS

10: air-permeable film layer
20: adhesive layer
30: bi-component non-woven fabric layer
40: adhesive layer
50: polypropylene spunbond non-woven fabric layer
60: air-permeable film supply device 61: adhesive tank
62: gravure coater 63: pressurized rubber roll
64: pressurized auxiliary steel roll 65: drying chamber
66: first compression roller 67: second compression roller
68: bi-component non-woven fabric supply device
69: laminate film winding device for blocking virus

The invention claimed is:

1. A method for manufacturing a laminate film for blocking a virus, comprising:
   a) manufacturing an air-permeable film by stretching a disc-shaped sheet obtained by melt-extruding a compound composition for an air-permeable film in an extruder and processing the compound composition through a T-die or a circular die,
   b) applying an adhesive comprising a polyether polyol, a polyester polyol, and an isocyanate-based curing agent on one surface of the air-permeable film obtained from the stretching,
   c) adhering, to the air-permeable film applied with the adhesive, a bi-component non-woven fabric which is a polyolefin-based mixed non-woven fabric, and
   d) rolling using a roller,
   wherein the air-permeable film is a polyethylene film comprising an inorganic filler,
   wherein the bi-component non-woven fabric is a laminate of a polypropylene spunbond non-woven fabric and a polyethylene spunbond non-woven fabric, and
   wherein a weight ratio of the polypropylene spunbond non-woven fabric and the polyethylene spunbond non-woven fabric is 40 to 60: 10 to 90.

2. The method of claim 1, further comprising:
   e) applying the adhesive to the other side of the air-permeable film,
   f) adhering, to the air-permeable film applied with the adhesive, a polypropylene spunbond non-woven fabric, and
   g) rolling using the roller.

3. The method of claim 1, further comprising, after a), performing a plasma treatment on the air-permeable film.

4. The method of claim 1, wherein the adhesive is applied by using a copper plate of a gravure coater which is engraved into a size of 40 to 250 mesh, and laser-engraved in a line thickness x line spacing x line depth of 0.1 to 1 mm×1 to 10 mm×10 to 150 μm.

* * * * *